A Context-Aware Decision Engine for Content Adaptation", IEEE
United States Patent
Danieli et al.

(10) Patent No.: US 7,458,894 B2
(45) Date of Patent: Dec. 2, 2008

(54) ONLINE GAMING SPECTATOR SYSTEM

(75) Inventors: Damon V. Danieli, Clyde Hill, WA (US);
Jason Kirk Keimig, Redmond, WA (US); Tracey Anne Montoya, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 10/943,084

(22) Filed: Sep. 15, 2004

(65) Prior Publication Data

US 2006/0058103 A1 Mar. 16, 2006

(51) Int. Cl.
*A63F 9/24* (2006.01)
(52) U.S. Cl. .......................................... 463/42
(58) Field of Classification Search .............. 463/42
See application file for complete search history.

(56) References Cited

U.S. PATENT DOCUMENTS

| | | | | |
|---|---|---|---|---|
| 6,380,933 B1 * | 4/2002 | Sharir et al. | ................ | 345/419 |
| 6,684,062 B1 * | 1/2004 | Gosior et al. | ................ | 455/73 |
| 2002/0032056 A1 * | 3/2002 | Oh | ............................... | 463/42 |
| 2003/0009525 A1 * | 1/2003 | Yasue | ........................ | 709/205 |
| 2003/0038805 A1 * | 2/2003 | Wong et al. | ................. | 345/473 |

OTHER PUBLICATIONS

"A Context-Aware Decision Engine for Content Adaptation", IEEE Publication, pp. 41 & 42 (highlighted), Issue: Jul-Sep. 2002.*

* cited by examiner

*Primary Examiner*—Robert E. Pezzuto
*Assistant Examiner*—Omkar Deodhar
(74) *Attorney, Agent, or Firm*—Workman Nydegger

(57) ABSTRACT

During an online event, a spectator process monitors a state of the event, updating a spectator model, so that spectator data streams can be generated and provided to spectators. The spectator data streams can be formatted and provided with content appropriate for use by different types of spectator devices used by the spectators. The spectator process can also automatically generate virtual commentary appropriate for the action occurring in the event for inclusion in the spectator data streams. A media server receives the rendered data streams and distributes them to the electronic devices being used by the spectators. The distribution can be delayed to avoid a spectator conveying information to a participant that would provide an unfair advantage. Executable code can be included in the spectator data stream to provide additional functionality and facilitate interaction between the spectators, and to enable a spectator to also "play" the game.

32 Claims, 6 Drawing Sheets

ONLINE GAMING SPECTATOR SYSTEM

FIELD OF THE INVENTION

This invention generally pertains to a system and a method that facilitate access by spectators to events that are occurring online, and more specifically, provides spectator data streams conveying a current state of an event, in a plurality of different formats required by different types of electronic devices being used by the spectators for following the event.

BACKGROUND OF THE INVENTION

Because we have become accustomed to viewing conventional sporting events on television or listening to the play-by-play narration of such events on a radio, it should not be surprising that there is substantial interest in achieving a similar type of spectator experience in regard to online games and other types of events. Most online electronic games cannot normally be viewed by a spectator attending the competition, because the competition is usually between players participating at diverse geographic locations. Also, instead of being assembled to play in person, the participants typically interact within the virtual environment of a game, as the game is played over the Internet or other network. Thus, to follow the action in an online electronic game or other online event that is not attended in person, it might instead be preferable to use a personal computer (PC), gaming device, or other electronic communication device, to view and/or listen to the game action as the game progresses.

The prior art has attempted to enable game spectators to view online electronic games in progress, but there are several problems with the solutions that were previously developed. As shown by a block diagram 400 in FIG. 4, one prior art approach, which is used by games such as Quake 3 Arena™, and MechWarrior™, employs a game server 402 to both host the game being played and provide a data stream to spectators, enabling them to follow the game action. In FIG. 4, a plurality of participants are represented by way of example, by a participant 404a and a participant 404b, and the PCs used by these participants to play the game are coupled in communication over the Internet (or other network) with game server 402. In addition, a plurality of spectators are coupled to game server 402, as represented, for example, by a participant 406a and a participant 406b. Each of the participants and the spectators must use a computing device (e.g., a PC) that is compatible for executing the game software for the game hosted by the game server. A more significant drawback is that the game server can only support a limited number of spectators, since the spectator connection to the game server requires that the server allocate computing resources, such as connections, memory state updates, etc., for providing the game state data stream to the spectators. Adding more than a few spectators will adversely impact on the game server's ability to both effectively host the game being played by the participants and its ability to provide a data stream for the game to the spectators.

A prior art solution that partially addresses the problems of this previous approach is shown in a block diagram 408 in FIG. 5. In this approach, which is used by online games such as Quake TV™, game server 402 hosts the game being played by the participants, but need only provide a single data stream of the game state to a spectator relay 410. The spectator relay then provides each spectator with a corresponding data stream of the game state. Many more spectators can thus be served by the spectator relay, because it need only serve the data stream and does not host the game played by the participants. However, it is again necessary for each spectator to execute the game being played by the participants on the spectators' computing devices or game consoles in order to render the action occurring in the game.

One other prior art approach is worthy of mention, although it apparently has not been commercially developed or publicly deployed. As shown in a block diagram 412 in FIG. 6, this employs game server 402 to host the game being played by the participants and to provide a data stream of game state to a primary spectator 416. The PC used by the primary spectator then employs video capture hardware 414 (such as a video capture computer card—(not shown)) to capture video of the game state as received by the primary spectator. The game state is captured as a raw video data file. This raw video data file can then be transferred over the Internet or other network to other spectators, such as a spectator 406b, for display on those spectators' computing devices or gaming devices. However, a significant drawback arises because the video capture hardware only produces the raw video file that corresponds to the video that the primary spectator 416 saw on the primary spectator's monitor. Also, there is no convenient way to edit or augment the video data in the raw video file transferred to other spectators, such as spectator 406b.

There are other aspects that should be addressed in providing a better solution of this problem. One advantage of watching an actual sporting event being televised or broadcast over the radio is the additional entertainment and information provided by the narrators' commentary regarding the game and/or the participants. Radio depends solely on the narrative commentary to describe the action and to provide further entertainment value by enriching the experience of the listener. Electronic games sometimes include a virtaul host that adds narrative to the game action, but only for the participants. For example, in Microsoft Corporation's Links™ golf game, the play can optionally be accompanied by appropriate narrative commentary that is audible to the participants. Like the commentary enjoyed by spectators of conventional broadcasts, it would be desirable to provide appropriate narrative commentary to the spectators of online games. For spectators using a cell phone or other audio-only electronic device, in order to follow the action in an electronic game, audio commentary may be the only practical way to follow what is happening in the game, since the bandwidth over a cell network for graphic visual content relating to a game may be inadequate to provide a rich experience. Indeed, it is clearly important to be able to supply data streams with different forms of content and format for a variety of different types of computing devices and other electronic devices used by the spectators, and to enable such devices to provide a spectator function for online games without requiring the devices to actually execute a software copy of the game.

Furthermore, it would be desirable to provide other types of data or information to spectators that are currently not provided to spectators of online games. For example, the spectators would benefit from being able to selectively view the game action from different viewpoints, using software that is included as metadata and which responds to the input from spectators to control the viewpoint. In addition to the data that reports the current state of a game, the spectator data should also include metadata providing other functions, such as an explanation of the game rules when a play relating to details of the rules has occurred, or stats for the participants in the game. A further desirable feature in some games would enable spectators to monitor participants' text and voice chat sessions during a game. Parents of younger children, or others, may also desire that expletives voiced during game play by the participants be blanked or bleeped so that they are not heard.

Another important consideration is that the spectators must be prevented from providing any assistance to participants by making any "out of channel" communications, e.g., over a telephone. For example, if the spectators are shown the cards held by participants in a card game, it should not be possible for a spectator to affect game play by calling one of the participants to provide that information before the play of the hand has been completed. Accordingly, it would be desirable to delay the data stream for a game sufficiently long to prevent such undesired interaction between spectators and participants.

SUMMARY OF THE INVENTION

Since spectators may want to follow the play in an online electronic game or other event using a variety of different electronic devices, such as game consoles, PCs, cell phones, personal data assistants (PDAs), etc., it is important that appropriately formatted data be provided to each such device to enable that type of device to provide a spectator experience. The data provided to each such device must also be appropriate to the limitation of the device in regard to providing video and/or audio to the spectator, such as the bandwidth available and the graphics or audio capabilities of the device. The present invention addresses these issues, as well as readily enabling dynamic scaling of available computing resources to support almost any number of spectators who may be using a variety of different types of devices to follow the play, without having any adverse impact on the play by the participants. A spectator process is employed to track the state of the electronic game and can also enable a number of features that substantially expand the experience provided the spectators of the game. Further details of these features are discussed below.

One aspect of the present invention is specifically directed to a method for providing a data stream to a plurality of spectators for an electronic game being played online, to enable the spectators to follow the play in the electronic game. The method includes the step of examining a current state, and based upon the current state, updating a spectator model for each of a plurality of different types of devices being used by spectators to follow the action in the electronic game or other online event. This step produces an updated spectator model for each different type of device. Appropriate data streams are generated, based upon the updated spectator model, for each different type of device being used by the spectators and are transmitted to the devices being used by the spectators, to enable the spectators to follow the play in the electronic game. The preceding steps are repeated until the electronic game is completed.

If there are only a few spectators, the electronic game that is being played by participants can be hosted on the same computing device that also carries out the task of enabling the spectators to follow the game play. Alternatively, all of the available computing resources can be dynamically allocated between hosting the electronic game, providing a spectator process, and relaying the data streams to the devices used by the spectators.

One of the additional features that can be accomplished is to include a narrative or commentary for the play in the electronic game with at least one data stream that is generated for transmission. Also, at least one data stream that is generated can provide a narrative that includes an explanation of such things as a play that has occurred in the electronic game, and/or rules that are applied in the electronic game, and/or stats for a participant.

One advantage of this invention is that it does not require the type of device being used by a spectator to follow the play in the electronic game to actually execute the electronic game. For certain simple devices such as a cell phone, the data stream that is transmitted may include primarily audio data, with little or no video data. For other types of devices, a generic data stream will be transmitted that is rendered as a presentation.

In addition to providing information specific to the play in the electronic game, metadata not directly defined by the current state of the electronic game may also be included in the data stream. The metadata might convey executable code that enables a spectator to make a wager on a condition in the electronic game, or even engage in "playing the electronic game" along with one or more of the participants, relative to a current state of the electronic game. For example, a spectator watching a participant miss a basketball shot in a tournament might activate a control that runs executable code conveyed as the metadata, on the spectator's electronic device, enabling the spectator to try making the basketball shot that was just missed.

Another optional function that can be provided with the present invention is hosting either a voice or a text chat session by a group of the spectators, who are following the play in the electronic game. A different and unrelated function that involves audio data relates to censoring the audio data from participants to edit the data streams that are transmitted to the different types of devices, to either delete undesired language or mask the undesired language with a sound that makes the undesired language incomprehensible to a listener. This function can be beneficial in protecting some spectators, such as younger children, from being exposed to inappropriate language by the participants in the electronic game.

Another concern that might arise in certain types of electronic games, such as those in which the spectators can see each player's cards in a card game like poker relates to cheating. Using out of network communications, a spectator might tell one of the participants the cards that are being held by the other participants. Accordingly, in such cases, the present invention preferably includes the step of delaying transmission of the data streams to the plurality of spectators for a defined time interval, so that a spectator receiving a data stream is unable to provide information included in the data stream to any participant during the play of the electronic game, at a time when the information might provide an unfair advantage to the participant receiving the information, relative to any other participant.

Another aspect of the present invention is directed to a memory medium storing machine executable instructions for carrying out steps that are generally consistent with the method discussed above. Yet another aspect is directed to a system for providing data streams to a plurality of spectators for an electronic game being played online over a network, to enable the spectators to follow the play in the electronic game on a plurality of spectator devices. The system includes a memory in which machine instructions are stored, a network interface that enables the data streams to be transmitted over the network, and a processor that is coupled to the memory and to the network interface. The processor executes the machine instructions stored in the memory and carries out a plurality of functions that are again, generally consistent with the steps of the method discussed above. The processor can execute functions consistent with producing the data streams, and/or can distribute the data streams over appropriate networks to the electronic device used by the spectators.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
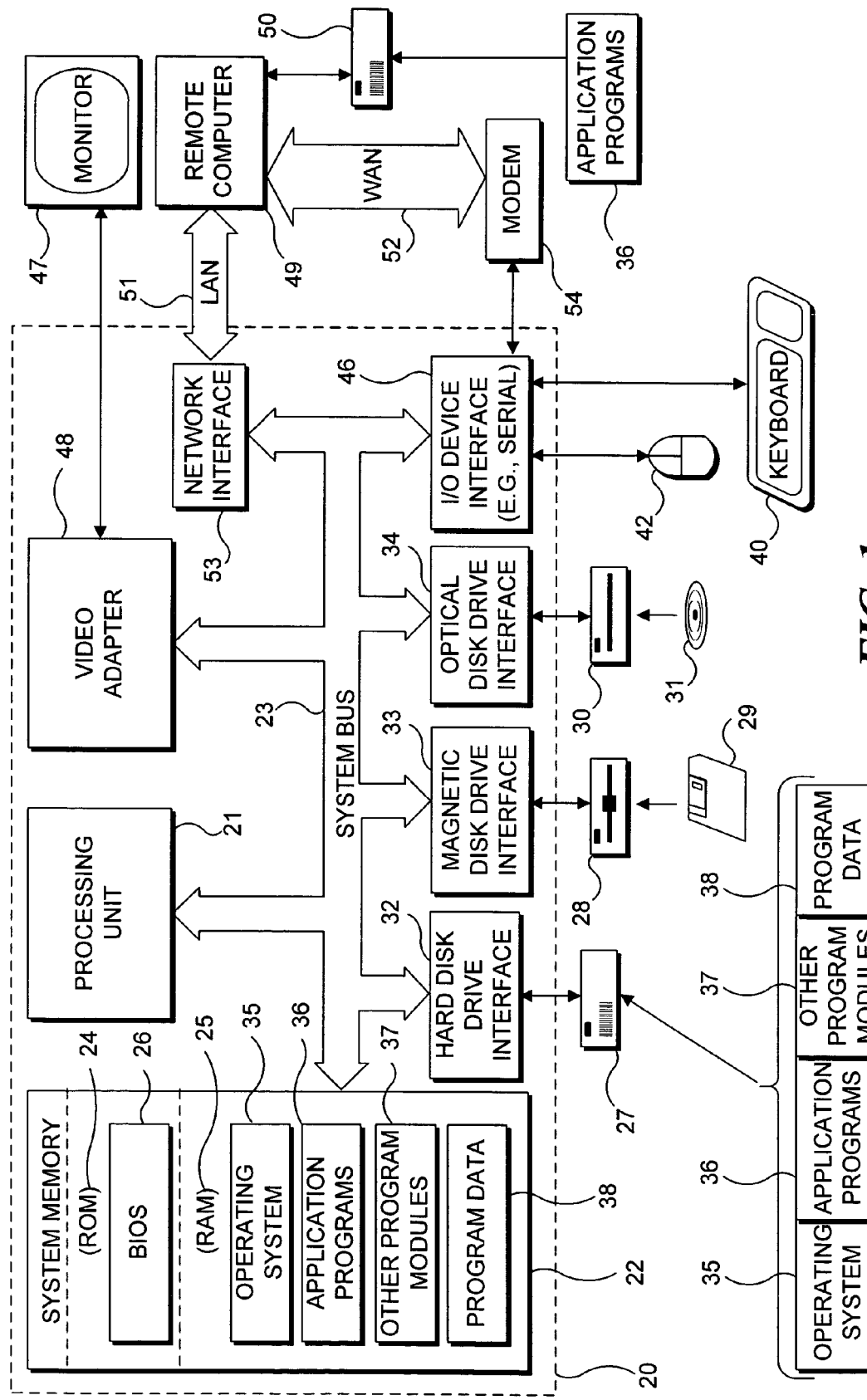
FIG. 1 is a functional block diagram of a conventional personal computer (PC), or server, which are suitable for use in practicing various functions relating to the present invention.

Exemplary Computing System for Implementing at Least Part of the Present Invention With reference to FIG. 1, an exemplary system suitable for implementing at least part of the present invention is shown. The system includes a general purpose computing device in the form of a conventional PC 20 (or server), provided with a processing unit 21, a system memory 22, and a system bus 23. Clearly, some spectators will be using a PC such as PC 20 to receive the audio and video data provided as spectator data streams in the present invention. Also, PC 20 represents an embodiment of a server such as may be used to host an online game, or to implement the spectator process, or distribute the different types of spectator data streams to the electronic devices being used by the spectators.

In PC 20, the system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 is connected to system bus 23 via an appropriate interface, such as a video adapter 48. It will be appreciated that PCs are often coupled to other peripheral output devices (not shown), such as speakers (through a sound card or other audio interface—not shown, which can be used by an audience for listening to audio data) and printers.

The present invention may be practiced on a single machine, although PC 20 can also implement the present invention in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers and other electronic devices used by spectators may be employed, such as wireless communications and wide band network links.

Exemplary Gaming System for Use by a Participant or a Spectator

While many other types of electronic devices can be employed by spectators in accord with the present invention, to follow play of a game, it is likely that initially, the present invention will be employed to provide a spectator data stream of video and audio data to spectators using a gaming system, perhaps of the same type employed by the participants in an online game. Accordingly, it is appropriate to provide further information about a suitable gaming system, as an example of at least one suitable electronic device (other than PC 20) that might be used by a spectator to monitor the play of an online game.

Figure 2:
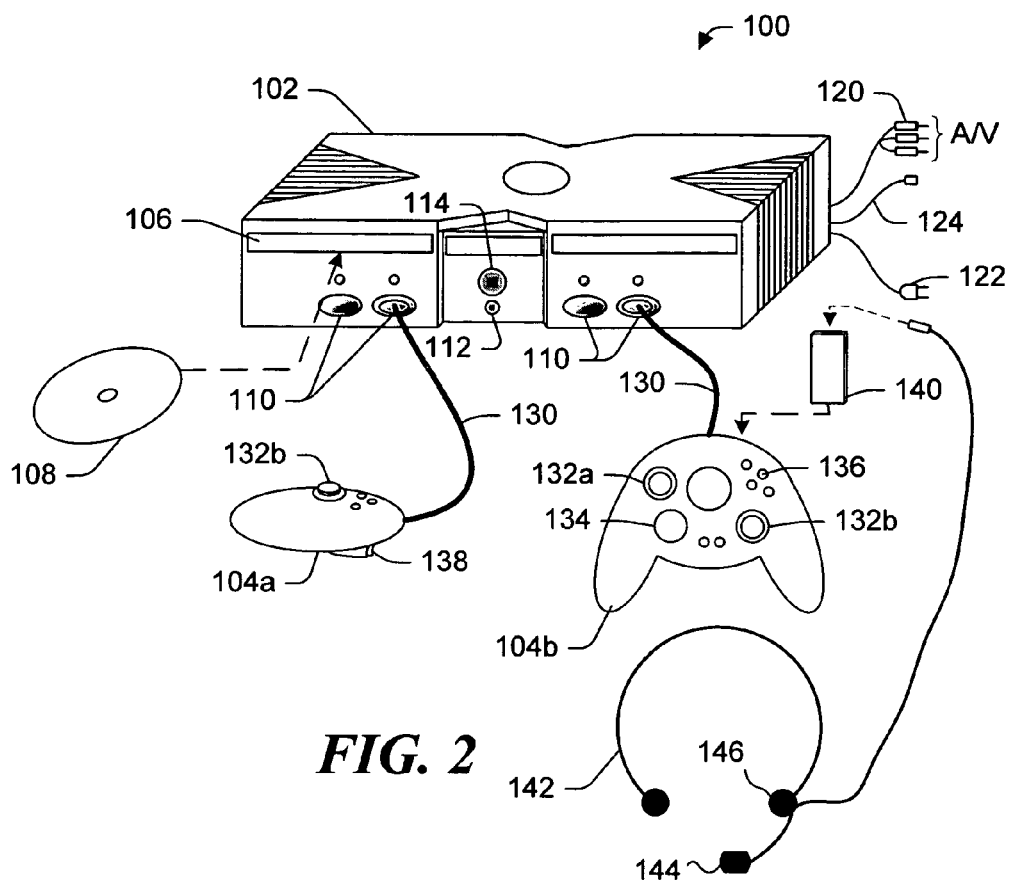
FIG. 2 is an isometric view of a gaming device and associated components, which are usable with the present invention, both by participants in an electronic game being played over a network and by spectators following the play in such a game.

As shown in FIG. 2, an exemplary electronic gaming system 100 includes a game console 102 that supports up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media include DVD discs and compact disk-read only memory (CD-ROM) discs. In this gaming system, game programs are preferably distributed for use with the game console on DVD discs, but it is also contemplated that other storage media might instead be used, or that games and other programs can be downloaded over the Internet or other network.

On a front face of game console 102 are four connectors 110 that are provided for electrically connecting to the controllers, although other types of connectors or wireless connections might alternatively be employed. A power button 112 and a disc tray eject button 114 are also positioned on the front face of game console 102. Power button 112 controls application of electrical power to the game console, and eject button 114 alternately opens and closes a tray (not shown) of portable media drive 106 to enable insertion and extraction of storage disc 108 so that the digital data on it can be read and loaded into memory or stored on the hard drive for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to communicate data through an Ethernet connection to/from a network and/or the Internet, or through a broadband connection. Alternatively, it is contemplated that a modem (not shown) may be employed to communicate data to/from a network and/or the Internet. As yet a further alternative, the game console can be directly linked to another game console via an Ethernet cross-over cable (not shown).

Each controller 104a and 104b is coupled to game console 102 via a lead (or alternatively, through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the software executed by the game console. As illustrated in FIG. 2, each controller 104a and 104b is equipped with two thumb sticks 132a and 132b, a D-pad 134, buttons 136, and two triggers 138. These controllers are merely representative, and other gaming input and control mechanisms may be substituted for or used in addition to those shown in FIG. 2, for controlling game console 102.

Removable function units or modules can optionally be inserted into controllers 104 to provide additional functionality. For example, a portable memory unit (not shown) enables users to store game parameters and port them for use on another game console by inserting the portable memory unit into a controller on the other console. Other removable function units are available for use with the controller. In connection with the present invention, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and an headphone 146 or other type of audio transducer for producing audible sound in response to an output signal from the game console. Alternatively, the voice communicator capability is included as an integral part of a controller (not shown) that is generally like controllers 104a and 104b in other respects. The controllers illustrated in FIG. 2 are configured to accommodate two removable function units or modules, although more or fewer than two modules may instead be employed. The voice communication capability, when game console 102 is used by one or more spectators, enable the spectators to engage in a voice chat session with other spectators, or with a moderator of a game, and can be used instead of the speakers coupled to the television or other monitor to enable the spectators to follow spectator audio data streamed to the game console in accord with the present invention.

In addition to its use by one or more participants in playing games (or by one or more spectators in following the action in games), gaming system 100 can also play music, and videos on CDs and DVDs. It is contemplated that other functions can be implemented by the game controller using digital data stored on the hard disk drive or read from optical storage disc 108 in drive 106, or from an online source, or from a function unit or module, or provided as metadata that are included with the spectator video/audio data that are streamed to the game console, as further discussed below.

Functional Components of the Game Console

Figure 3:
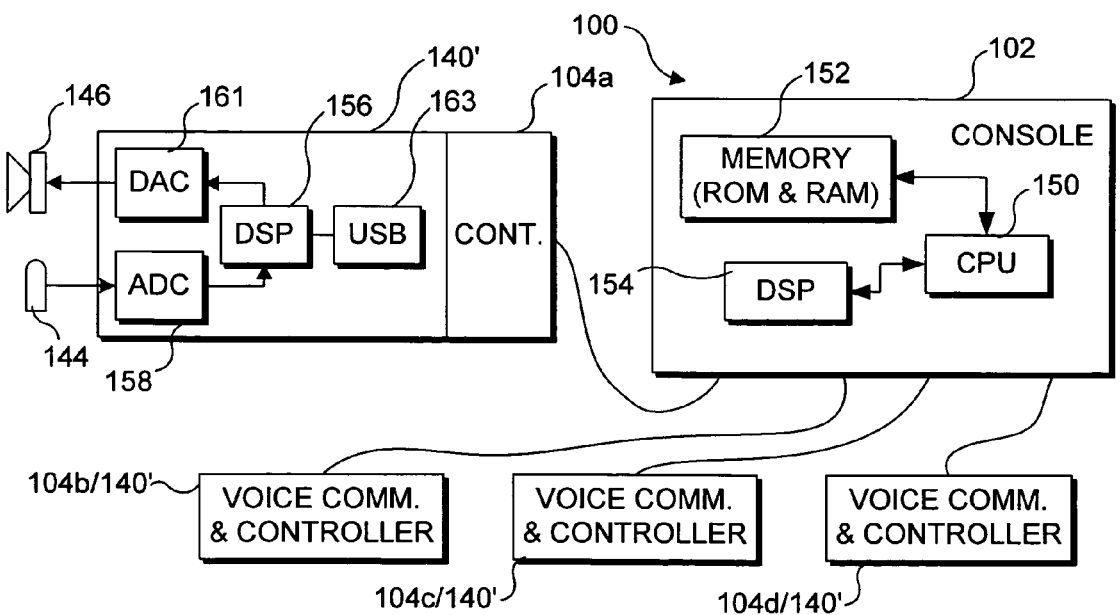
FIG. 3 is a functional block diagram of the gaming device, voice communication accessory, controller of FIG. 2.
Figure 4:
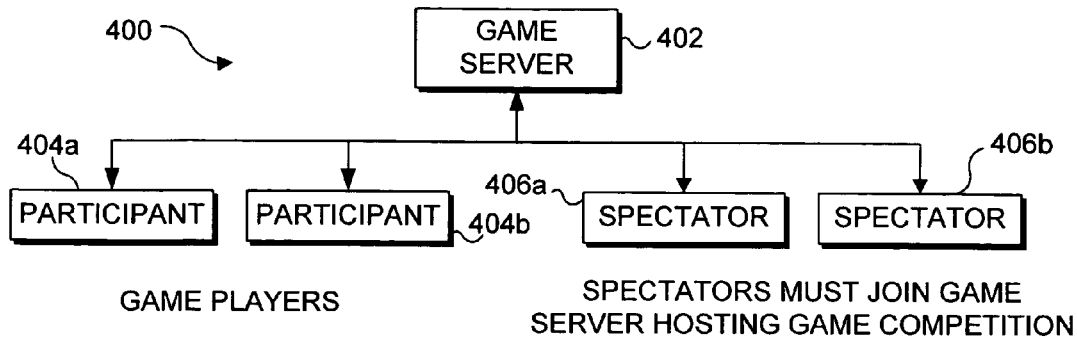
FIG. 4 (Prior Art) is a block diagram showing one approach previously used, wherein spectators are hosted on a game server, along with the participants, thereby limiting the number of spectators that can be included with adversely affecting the game play.
Figure 5:
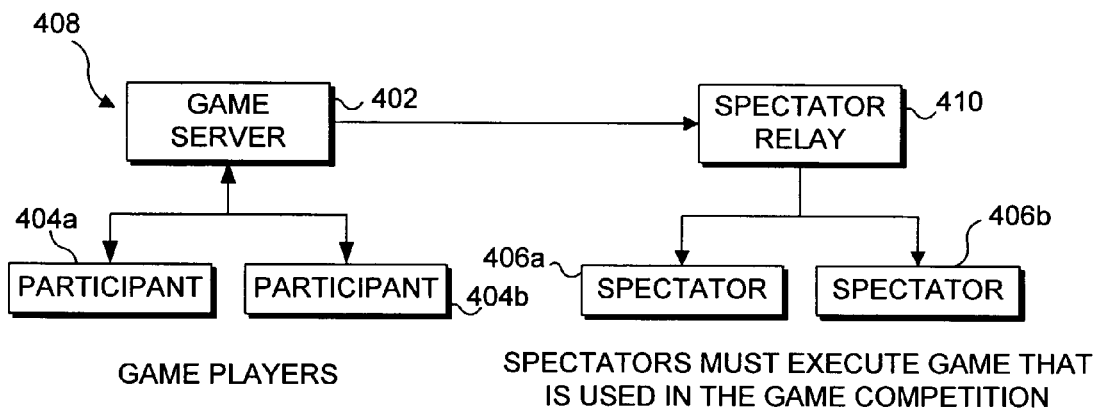
FIG. 5 (Prior Art) is a block diagram of another approach that was previously used, wherein the game state is conveyed to a spectator relay, that relays the game state to spectators having computing devices that are also executing the game software for the game played by the participants.
Figure 6:
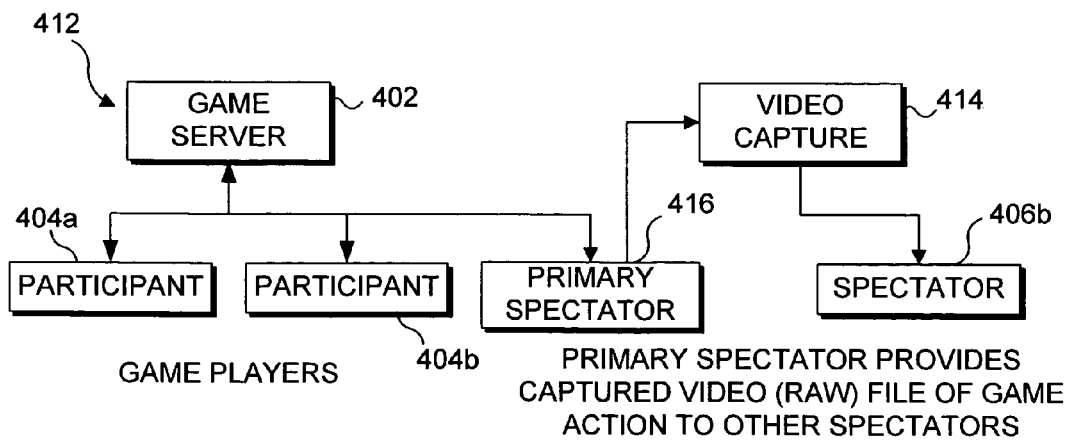
FIG. 6 (Prior Art) is a block diagram showing yet another approach, wherein a primary spectator is connected to the gamer server and captures raw video of the game action for transmittal to other spectators.

Turning now to FIG. 3, a functional block diagram illustrates, in an exemplary manner, the components of the game console that enable game playing and facilitate voice or verbal communication between participants or between spectators using the multiplayer game console. As noted above, up to four people can use exemplary game console 100, and each person can be provided with a controller and voice communicator. Details of a voice communicator module 140' are illustrated in connection with its associated controller 104a. It will be understood that controllers 104b, 104c, and 104d (if coupled to game console 100) can optionally each include a corresponding voice communication module 140' like that coupled to controller 104a. In this example, voice communication module 140' includes a digital signal processor (DSP) 156, an analog-to-digital converter (ADC) 158, a digital-to-analog converter (DAC) 161, and a universal serial bus (USB) interface 163. In response to sound in the environment that is incident upon it, microphone 144 produces an analog output signal that is input to ADC 158, which converts the analog signal into a corresponding digital signal. The digital signal from ADC 158 is input to DSP 156 for further processing, and the output of the DSP is applied to USB interface 163 for connection into controller 104a. In this embodiment, voice communication module 140' connects into the functional unit or module port on controller 104a through a USB connection (not separately shown). Similarly, digital sound data coming from game console 100 are conveyed through controller 104a and applied to USB interface 163, which conveys the digital signal to DSP 156 and onto DAC 161. DAC 161 converts the digital signal into a corresponding analog signal that is used to drive headphone 146.

With reference to game console 102, several key functional components are shown, although it should be understood that other functional components are also included, but not shown. Specifically, game console 100 includes a central processing unit (CPU) 150, a memory 152 that includes both read only memory (ROM) and random access memory (RAM). Also provided is a DSP 154. The digital signal produced by ADC 158 in response to the analog signal from microphone 144 is conveyed through controller 104a to CPU 150, which handles encoding of the voice stream signal for transmission to other local voice communication modules and to other game consoles over a broadband connection through an Ethernet port (not shown in FIG. 3) on the game console.

Alternatively, DSP 156 in voice communication module 140' can be employed to encode the digital signal produced by ADC 158 in response to the analog signal from microphone 144. The encoded data are then conveyed through controller 104a to CPU 150, which again handles transmission of the encoded data to other local voice communication modules and other game consoles over the broadband connection on the game console.

It should be noted that game console 102 can be either directly connected to another game console using a crossover Ethernet cable as a link for local peer-to-peer communications, or can be connected to one or more other game consoles through a more conventional network using a hub, switch, or other similar device, and/or can be connected to the Internet or other network through an appropriate cable modem, digital subscriber line (DSL) connection, other appropriate interface broadband connection, or even a telephone modem (not shown). Digital signals conveyed as packets over a direct or network connection are input to CPU 150 through the Ethernet port on game console 100 (or from other voice communication modules and controllers connected to the same game console), and are processed by the CPU to decode data packets to recover digital sound data that is applied to DSP 154 for output mixing. The signal from DSP 154 is conveyed to the intended voice communication module for the player who is the recipient of the voice communication for input through USB interface 163.

Overview and the Spectator Process Used in an Embodiment

A preferred embodiment uses a spectator process to produce spectator data streams for the each of the electronic devices used by spectators to follow an event. The spectator process is a generic concept that can be applied to any event where a computer is involved in tracking the progress of one or more participants in the event (i.e., the players, athletes, competitors, etc). Participants are those who are actively engaged in events, while spectators passively watch and/or listen to events, but may have an indirect effect on an event (e.g., by voting, where the results of the vote can alter the course of an event). Events can be of different types depending upon physicality, location, viewability, etc. Each type of event is not exclusive of other types, since hybrid events can share real, recorded data and virtual, simulated data. Also, events can have portions that are real and portions that are virtual.

In a virtual event, there is no physical manifestation of an environment in which a participant interacts. Virtual events can be single player or multiplayer. Players usually access these events over a network (e.g., through a LAN, a WAN, a telephone, a wireless connection, or an Internet connection). The spectators usually access the viewable stream that enables them to follow the action in an event through a network, but they do not have to be on the same network as each other or as the participants. For example, participants can be playing a game over the Internet and spectators can be watching the game on their television sets or following the action on a cell phone or a PDA.

In connection with the present invention, events typically comprise games where a game "state" is produced and stored on a computer (e.g., in memory, on disk, or in other storage). Online computer games are by far the largest category of virtual events and include single-player, client/server, peer-to-peer, and massively multiplayer games.

Simulated events are based upon real action that cannot be viewed by spectators and must be simulated using measured input. For example, if the National Aeronautics and Space Administration (NASA) wanted to show spectators a Mars landing in real time based upon telemetric position data received from sensors on the lander, the spectator process of the present invention could monitor the "state" of each lander sensor (gyroscopes, accelerometers, barometers, temperature gauges, etc), internally simulate the position and status of the spacecraft lander modeling its state, and then render a graphical and commentator spectator data stream based upon the simulation. In contrast, real events have a physical manifestation that is augmented by the spectator process to become the spectator stream.

Video events are those that can be directly captured by a video camera. The role of the spectator process is to augment the video data stream by adding commentary and additional data (e.g., position around a track, a rank, and/or a score), which is the main mode of spectator events for television (TV). Examples of such events include the Superbowl™, the World Series™, the World Cup™, and the World Poker Tour™. However, if the present invention is used in connection with such events, an automated spectator process would receive the input video stream and create a spectator-ready output data stream for distribution over the network feed.

Some events (i.e., "augmented events") may have a physical manifestation, but in addition to following the action in the event, a spectator will typically want to also receive metadata providing information about the event. For example, a spectator data stream for a chess match intended for spectators following the game on a PC might include video data graphically showing the disposition of the chess pieces on a chess board, but in addition, the data stream that the spectator process creates can also include a two-dimensional (2D) virtual representation showing the possible moves in response to the last actual move, lines of attack, previous moves as a history relative to the current positions of the game pieces, and other information of interest to the spectators.

Much of what are now conventional video events (TV programs broadcast with live commentators) may, in the future, become augmented events using the present invention, as metadata providing information surrounding the event are included in a spectator data stream delivered over TV data distribution networks, such as cable, satellite, and over the air broadcasts. For example, the Tour de France™ currently is represented in TV programs primarily as video showing the participants riding bikes. What is currently missing in such coverage is a real-time update of the position of each rider compared to the peloton and relative to the position of the various team leaders, as well as information about the competition for various jerseys, and other items of interest to spectators who are avidly following the race. Future broadcasts using the present invention may include this augmented information, in addition to a pure video stream with voice over.

There are different methods of viewing a spectator data stream, depending mostly upon the type of electronic device being used by the spectator to follow the action in the event. The following discussion shows various types of spectator data streams that may be produced for this purpose, but is not clearly not intended to be exhaustive of the possibilities for applying this invention. The current plan is to offer multiple spectator data streams simultaneously to different audiences, where the spectators in each audience are using a plurality of different types of electronic devices to follow the action in an event.

The TV spectator data stream can be broadcast to many TVs at once, via a broadcast tower, cable, satellite, closed circuit, etc. The format of this type of spectator data stream would be provided to match the National TV Standards Committee (NTSC) format used in North America, and variants of the Phase Alternating Line (PAL) format used in much of the rest of the world. However, it is also contemplated that the TV spectator data stream may be digital and compressed with the Moving Picture Experts Group (MPEG) or Windows™ Media Video (WMV) standards, or other appropriate compression scheme. The spectator for such an event would need to set up the electronic device used for viewing to receive a specific channel to watch the spectator data stream provided. Viewing habits are moving toward on-demand and time-shifted recorded content, which can also be applied in receiving such a spectator data stream.

The Web spectator data stream will be a digital data stream that will be accessed via a web browser or other client component provided on an electronic device that connects over a network (Internet, LAN, etc). This digital stream will likely be compressed before transmission. The display clients used for browsing the Web are usually not content-specific and can view any type of data stream that is formatted for that client. Client software components that are usable in connection with enabling the spectator to follow an event through a spectator data stream that is broadcast over the Web include, for example, Microsoft Corporation's Internet Explorer™ and Media Player, Real Network Corporation's Real Player™, Macromedia Corporation's Flash™ program module, etc. The spectators would type in an appropriate Uniform Resource Locator (URL) in the browser address dialog (or click on one that has previously been defined) to select the spectator data stream being broadcast over the Web that they want to view. Web spectator data streams will most likely not be realtime so that they can be viewed at the convenience of the spectator.

It is also contemplated that a proprietary client spectator data stream may be provided that can only be viewed on specialized clients. For example, there may be events that can only be rendered on a specific type of game console, due to the requirements of the system and the proprietary format of the spectator data stream. There may be events which are limited to spectators having a PC executing a special software (e.g., those executing the software game Quake™). Or, the client (e.g. a specific type of game console) may be proprietary, while the format of the spectator data stream may be standard (for example MPEG).

If a spectator is using a device such as a radio, or a simple cell phone that only receives audio, a data stream data stream that is audio is appropriate to enable the spectator to follow the action in an event. The audio data will include a commentary that describes the action using words and will be streamed to the spectator's radio or cell phone. Other simple electronic devices, such as a PDA (Personal Digital Assistant) will be able to receive a spectator data stream with much the same content as will also be used for other small, hand-held devices, such as SPOT™ Watches, SmartPhones™, Windows™ Pocket PCS™, Palm™ handhelds, etc. Since these devices usually have much less resources (network bandwidth, rendering power, screen size, limited user input, etc., compared to PCs or game consoles), it will likely be appropriate to render the spectator data stream locally on the device. For example, a spectator data stream to enable a spectator to follow the World Poker Tour™ on a PDA might include audio, but not video graphics data. Instead, the spectator data stream provided such devices will indicate the cards in a participant's hand, so that the card faces of the hands held by the participants can be drawn on the screen of the PDA using vector graphics that are local to the PDA.

Different Types of Commentary

A large portion of a spectator's experience while following an event is likely to come not only from the visual display of the event, but also from the running commentary that is integrated with the visual display of the action. Most of the current sports broadcasts that have a large spectator following are dependant upon good commentary that provides "color" and interest. In the present invention, computer commentary is optionally provided by the spectator process, which accesses prerecorded data or produces synthesized human voice to augment the visual input in the spectator data stream(s). The spectator process combines this appropriate computer-generated commentary with the visual data to provide the same type of enhanced experience to which spectators of conventional sporting events are accustomed. The addition of computer generated commentary is an important focus of the spectator process in the present invention, and greatly improves the spectator experience.

Although the spectator process will typically include data showing virtual activities along with an appropriate computer commentary, the inclusion of human commentary with these data in the spectator data steam is clearly not precluded. For example, if there is a special event (such as an online Celebrity Poker™ tournament), a producer of the tournament may want to provide a human to add commentary to the virtual game data. The human commentator(s) would be able to view the input stream(s) (possibly real, simulated or virtual data) and add voice over to the data. The voice(s) of the commentator(s) will then be converted into a digital signal and used as input (along with the initial input stream(s)) to the spectator process to create the output delivered in one or more spectator data streams to the spectators of the event. The spectator process may also augment the human commentary with a computer commentary or other audio information included as metadata in the spectator data stream.

Different Levels of Engagement for Spectators

The spectators of an event increasingly have more choices regarding their level of engagement with the event. Even with the passive medium of TV, it is now possible to make real-time choices by calling in on a phone (e.g., voting for songs on the Total Request Live™ (TRL) show on the MTV™ channel, voting for singers on American Idol™, or voting for specific people to be cut from reality shows). The following discusses some examples of the type of spectator engagement that will optionally be provided by the present invention to spectators of events, but these example are intended to be neither exclusive nor exhaustive of the contemplated capabilities of this invention.

Spectators are usually considered to be passive in that they "sit back" and simply follow an event. "Passive" means that the spectator has no interactivity with the experience (other than, for example, changing the channel to achieve a different experience). This passive mode is still the most popular, mass-market form of event data to enable a spectator to watch an event. Accordingly, by default, the present invention employs a mode that is based upon a visual aesthetic appropriate for passive viewing by spectators receiving the spectator data streams.

Semi-passive experiences provide the spectator some interaction, but not interaction that feeds back into the activity being followed. For example, a semi-passive experience would include participating in side-betting against other spectators on the outcome of an event, or creating a "Fantasy Team" that is awarded points based upon an action occurring in an event.

Semi-Active experiences provide for minimal feedback from the user to the experience. Examples of a semi-active experience include voting a contestant off of next week's reality show; or voting for a winner of a talent show. A spectator experience is semi active when the user has a limited choice that is not based upon the actual activity (i.e., voting "Yes/No" for a singer on the American Idol™ TV show is not the same as actively singing as a participant on the show) and if it is not directly affecting the current performance of a participant, even if it has an affect on an outcome in the event, although indirectly.

Active experiences enable a spectator to "play" alongside of the action, without actually being a true participant in an event. There are several different categories for the active level of engagement, depending upon the feedback relationship with the activity. One category is referred to as an "influencing" level of engagement, because the participant(s) in an event can be directly affected by the spectators. For example, a future reality show may REQUIRE the contestants to work with people online to solve a problem. A "ghosting" category of active experience includes many types of real, augmented, and virtual events, such as the ability to drive a virtual car alongside a professional racecar driver, or play a round of virtual golf alongside a professional golfer. The ghosting category of active experience is applicable when the spectator does not have any influence over the participants, but the actions of the spectator are joined with the participant(s) for the spectator's experience.

There are some types of experiences where a spectator can play alongside the participant(s) and the spectator process will simulate what the participant would do. For example, in a Poker Game, the spectator might only see the cards held by a single participant and make decisions each turn as to what that participant should do in playing the hand. If the spectator deviates from what the actual participant did, the computer running the spectator's experience may simulate what would have happened because, having received the spectator data stream, it knows both the card hands of all of the participants and can predict a possible outcome based upon the decisions made by the spectator, even though different than what occurred during the actual hand played in the event. Similarly, playing chess against a master might employ the computer to search for previous moves from that master in other matches. The program would then advise the spectator whether their choices have deviated from the actual match currently being played by the participants and give the spectator the choice to play it out or go back "on path," by returning to the moves actually made in the current match by the participants.

Different Types of "Time"

The spectator process can also work under different types of "time." In a "real-time" spectator process, one minute of participant action equals one minute of spectator data stream, but the two need not occur concurrently, since there may be delay between the participant action and the spectator action, or breaks in the streaming of the participant action to the spectators. The reporting of an event can have commercial breaks and interstitials, but the production of the spectator data stream may be happening in real-time, concurrently with the action, or be delayed. A live, real-time spectator data stream is one that is produced simultaneously with the action. What the spectator sees (and/or hears) is what is happening (i.e., a modulo any transmission delay). A delayed real-time spectator data stream is one that has been delayed (spooled or stored) for later viewing. The delay could have been done because access to information in the spectator data stream could provide an unfair advantage if disclosed to one or more of the participants in the event. For example, a virtual game show in which the user must answer questions could be adversely affected by enabling the information included in the spectator data stream to be conveyed (out of channel) by a spectator to a participant, enabling the participant to effectively cheat at the game by learning the answer to a question from a spectator who called the participant on the telephone.

Although the block diagrams of FIGS. 7 and 10, discussed below, might imply that the spectator process is a "filter" that is in-line with the input and output data streams, the operation of the spectator process does not preclude the ability for a game state to be stored (usually onto disk in digital fashion), so that the spectator process can then run "offline" or in batch mode to generate the output that will be transmitted as spectator data streams at a later time. Additional "offline" polish may be placed on these spectator data streams so that the final product is a well-edited result. The data used for the spectator data streams can also be censored to eliminated undesired language, before being applied in producing the spectator data streams.

A separate instance of a batch spectator process scenario is one where game state is stored and the spectator process is only invoked when a spectator wants to view (and/or listen to) it. For example, a tournament may include games for thousands of participants that are stored, but only accessed to create the spectator data streams when the winner is known, so that only the winner's previous matches are pulled from storage to produce the spectator data streams.

Additionally, on-demand spectator data streams may be generated in response to a spectator's request. For example, information for many types of games may be stored, but the data for a specific game will only be accessed and used to produce a spectator data stream when that game is requested by a spectator. The spectator data streams will thereby only be produced when requested by a spectator.

The spectator process may also compress time for an event when producing a spectator data stream by deleting gaps of time where inactivity occurred during the event. A chess match may have long periods where the participants are simply sitting and thinking, which does not provide much entertainment. This inactive time would be available for commentary, but once the commentary is completed, the spectator process can pause writing the output stream until the next move is made. Time compression can also be employed when generating non-real-time spectator data streams.

System for Enabling Multi-Type Spectator Data Streams

Figure 7:
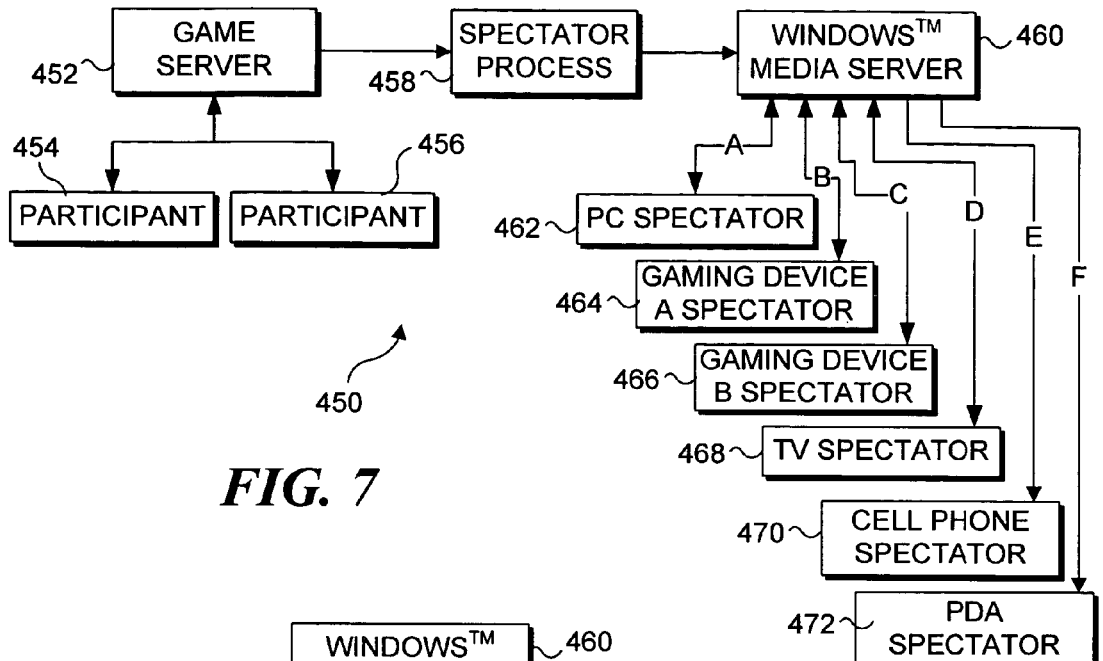
FIG. 7 is a functional block diagram of the system used in the present invention for enabling spectators using a variety of different types of electronic devices, to follow the game action with spectator data streams delivered in formats respectively appropriate for each such device.

FIG. 7 provides an overview 450, showing an exemplary preferred embodiment for the present invention in which a game server 452 is connected to enable one or more participants to play an online game. To simplify this illustration, only participants 454 and 456 are illustrated, but it should be understood that any number of participants, including massive numbers of participants can be connected to game server 452 for playing an online game, depending upon the game and other factors. The type of online game being played using game server 452 will usually impact upon the expectations of spectators desiring to follow the game play. For example, if the game being played is a card game between 2-4 participants, the spectators would want to see the cards that are being held by each participant, and perhaps be provided information about each participant and about details concerning the play of the card game, and the rules, if appropriate to better understand some complex aspect of the game. The present invention enable spectators to follow the play during the card game, as well as providing this additional meta information by way of a computer generated audio commentary.

Game server 452 is coupled to a spectator process 458, which monitors the game play and carries out the functions discussed above. Although other software platforms could be used instead, the embodiment shown in overview 450 distributes the output from spectator process 458 to the various spectators using Microsoft Corporation's Windows™ Media Server™ 460. The Windows Media Server is connected to the Internet and/or to various other networks and distribution channels to provide spectator data streams in appropriate formats for a variety of different types of electronic devices used by spectators to follow the play of the game. By way of example, these spectators might include a PC spectator 462, a gaming device A spectator 464, a gaming device B Spectator 466, a TV spectator 468, a cell phone spectator 470, and a PDA spectator 472. It will again be understood that the electronic devices mentioned for each of these spectators are not in any way intended to be limiting of the different types of electronic devices with which the present invention can be used to provide data to spectators, but instead, only represent examples of a few such devices. Also, it will be understood that thousands of spectators might be using each type of electronic device to follow the game play.

The spectator data stream provided to PC spectator 462, for example, over the Internet, will clearly differ from the format of the spectator data stream provided to cell phone spectator 470. Whereas PC spectator 462 can display full-screen graphics corresponding to the game play and produce audio data that can be listened to on external speakers, cell phone spectator 470 will typically be limited to audio and graphics that are generated on a cell phone in response to commands. For example, the cards held by a player in the electronic game might be displayed on the cell phone display screen, but generated locally in response to card font data included in the spectator data stream received over the cell phone network. Similarly, the spectator data stream provided to PDA spectator 472, although more complex than that provided to cell phone spectator 470, will also likely be much less complex than that provided to gaming device spectators 464 and 466. In addition to differences in the amount and complexity of the data provided in each of these different data streams, there will clearly be differences in the format of the data. For example, TV spectator 468 will likely be provided NTSC (or PAL in locations other than North America) formatted television signals that convey the data for enabling TV spectator 468 to follow the online game play. Even similar electronic devices may require very different formats for the spectator data stream. For example, gaming device A spectator 464 may be using a gaming device that is a different model and/or from a different manufacturer than gaming device B spectator 466. Accordingly, the spectator data stream provided to each of these two gaming devices will thus likely be very different in both format and content.

Figure 8:
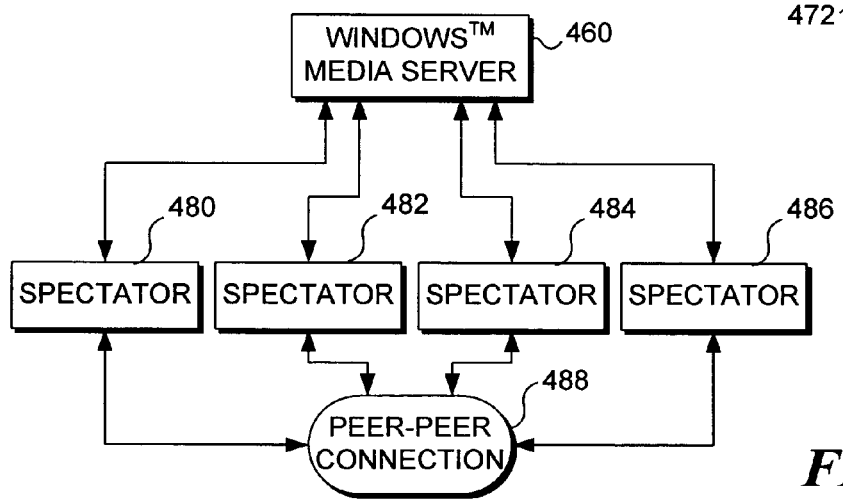
FIG. 8 is a block diagram illustrating how spectators can be coupled to a media server to receive spectator data streams, while also be connected in a peer-to-peer client network, to facilitate voice chat, or text chat, or to participate in voting, or to play along with one or more participants.

FIG. 8 illustrates another functional feature of the present invention. As shown therein, spectators 480, 482, 484, and 486 are connected over a network to Windows media server 460 to receive spectator data streams that enable spectators to follow the action during an event. In addition, each of the spectators is connected with the others through a peer-to-peer connections 488. Once thus connected, the spectators can follow the action during the event through the connection to the media server, as well as carry on a voice chat session or a text chat session with the other spectators over the peer-to-peer connection. It is also possible to implement such additional functions using a client/server connection in which the windows media server (or another server) is used for hosting communications between the spectators (i.e., the clients). In one embodiment of the present invention, is generally considered preferable to do all communications, such as voice chat, in a peer-to-peer mode, while conducting other functions that must be secure, such as purchasing or voting, using a client/server connection. However, this choice will typically be up to the designer of the electronic game or up to the designer or host of the event.

While many electronic games include a real-time virtual narrative of pre-recorded or synthesized speech comments that are intended to accompany the play and actions of the participants, it is only in conventional sport games and events that human commentators provide a narrative track intended for spectators. However, the present invention enables an automatically generated (by a computer) virtual narrative or commentary of appropriate comments to be included with the spectator data streams that are transmitted to each of the spectators, who are following an event. The narrative may explain rules of the event that relate to activities that just occurred in the event, or explain details of the game, or provide information about the participants, or about other matters of likely interest to the spectators. These metadata will be automatically generated, but can also be combined with a human commentary, for special events, if desired by the organizer of the event. Again, the spectator data streams provided for use on different types of electronic devices used to listen to and/or view the data streams will be tailored to match the capabilities of the devices. For example, only a subset of metadata comprising the virtual commentary might be provided to electronic devices having a limited bandwidth or limited capability to receive continuous audio data streams.

Figure 9:
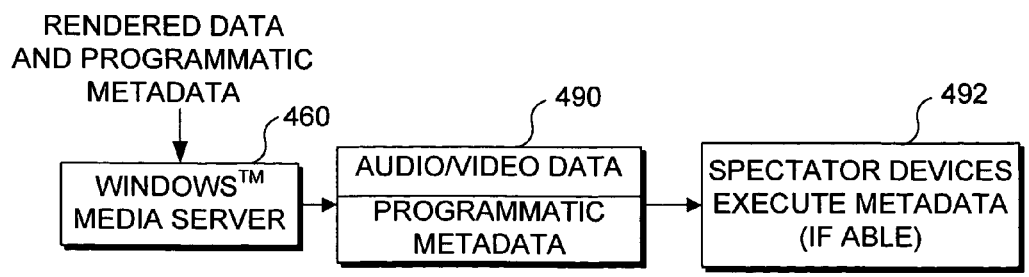
FIG. 9 is a block diagram illustrating how programmatic metadata are transferred to spectators for execution on the spectators' devices, to enable other types of activity and engagement with the events being followed.

Metadata can also comprise executable content that is conveyed with the audio/video data in the spectator data streams transmitted to the spectators. In an example illustrating the use of this capability, which is shown in FIG. 9, rendered data, including both audio and video data for an event, as well as programmatic metadata, are provided to Windows media server 460 and are distributed by it as indicated in a block 490, to spectator electronic devices 492. Programmatic metadata can be native code (compiled for or targeted for specific electronic devices), interpreted code (such as code in the programming language Lua, which is able to run in a virtual machine), or a mix of both (such as C# code and Java script), which are compiled on-the-fly by the target electronic device. Electronic devices that are capable of executing the programmatic metadata can thereby offer additional features to the spectators using the devices to follow the action in an event. For example, such devices can execute code conveyed to the device that enables a spectator to place side bets with other spectators while the action in an event is taking place, or can enable a spectator to apparently "play along" with a participant (but without interfering with the action of that participant in the event, since the apparent play is only local to the spectator's electronic device. Further, the programmatic metadata can be executed to enable a spectator to communicate with other spectators who may be using different types of electronic devices to follow the action in an event.

Figure 10:
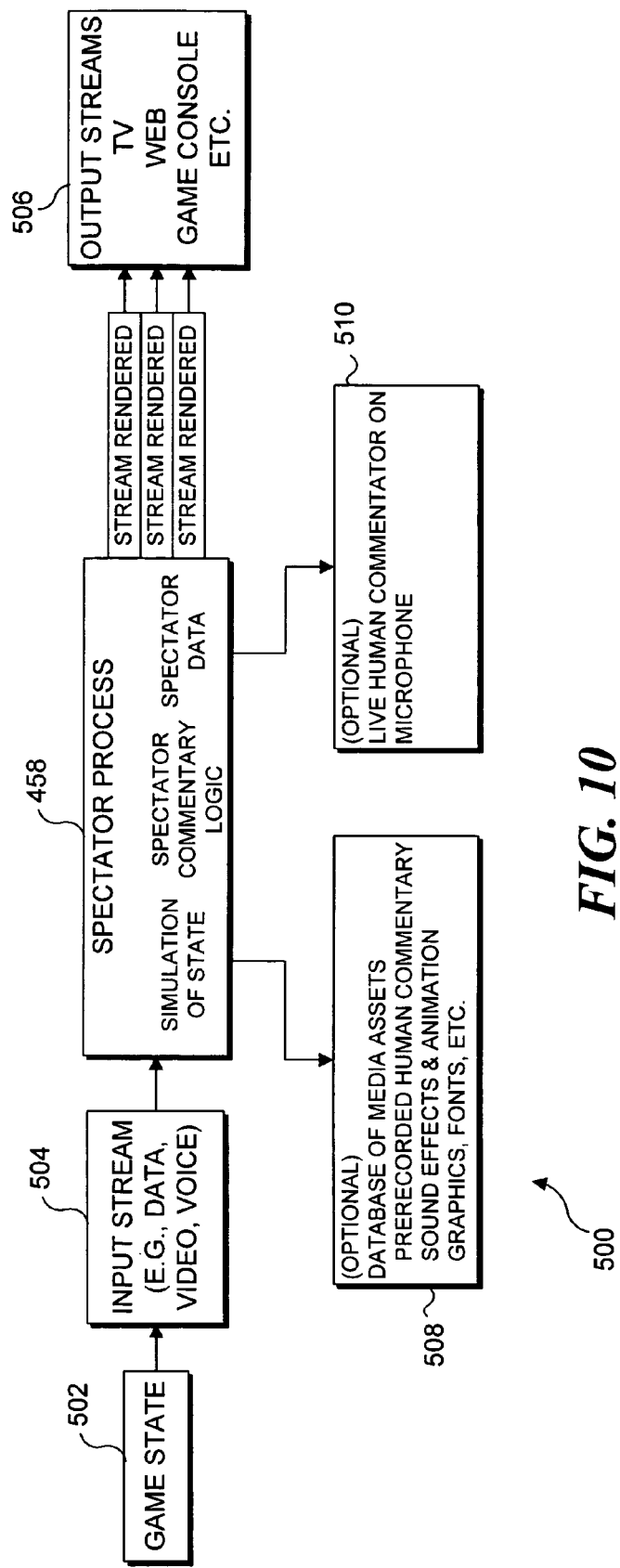
FIG. 10 is a functional block diagram of the spectator process.

FIG. 10 includes a block diagram 500 showing further details of spectator process 458, which monitors the action occurring during the event and carries out the other functions discussed above. For example, when monitoring an event comprising an online game, a game state 502 is provided from the game host server to the spectator process, as an input stream 504. Input stream 504 may include video, and/or voice data, as well as other data. The spectator renders each of the spectator data streams for each type of electronic device that might be used by spectators following the game. Resulting output streams 506 are provided in formats and with content appropriate for TV, Web browser viewing, game consoles, or other types of electronic devices. Optionally, as indicated in a block 508, using an available database of media assets, spectator process 458 can access prerecorded virtual human commentary, sound effects and animation, graphics, selected fonts, and other components that will be included in the streams that are rendered and transmitted to the spectators desiring to follow the event.

As noted above, the spectator data streams that are rendered may also be stored as files that can be subsequently accessed by spectators rather than in real-time while the event is in progress. Also, spectator process 458 can produce the spectator data streams nominally in real-time, delayed sufficiently (e.g., for a predetermined time interval or until an event such as the completion of a card hand has occurred) so that any spectator receiving information conveyed by the data streams would not be able to provide that information to one of the participants in a game that would provide that participant with an unfair advantage relative to the other participants. For example, if the spectators are watching a poker game in real-time and are provided information regarding the cards held by each of the participants, the information will not be provided to the spectators until a hand is first completed, since otherwise, a spectator receiving information regarding the participants' cards might call one of the participants by telephone and provide that information to the participant, so that the participant would know how to bet the hand in the virtual card game.

A block 510 indicates a further option, which is to include a commentary provided by a human using a microphone, as part of the spectator data streams that are transmitted to the spectators, who are following the event. As noted above, the live commentary can be combined with the automatically computer produced virtual commentary, if desired. Spectator process 458 prepares an appropriate simulation of game state, using data from the optional database of media assets and by applying appropriate logic to develop a virtual commentary that provides an enhanced experience to spectators following the action in the game or other type of the event. The spectator data are formatted and provided as an appropriate signal and through an appropriate interface to be input to the electronic devices that they are using to follow the event.

Figure 11:
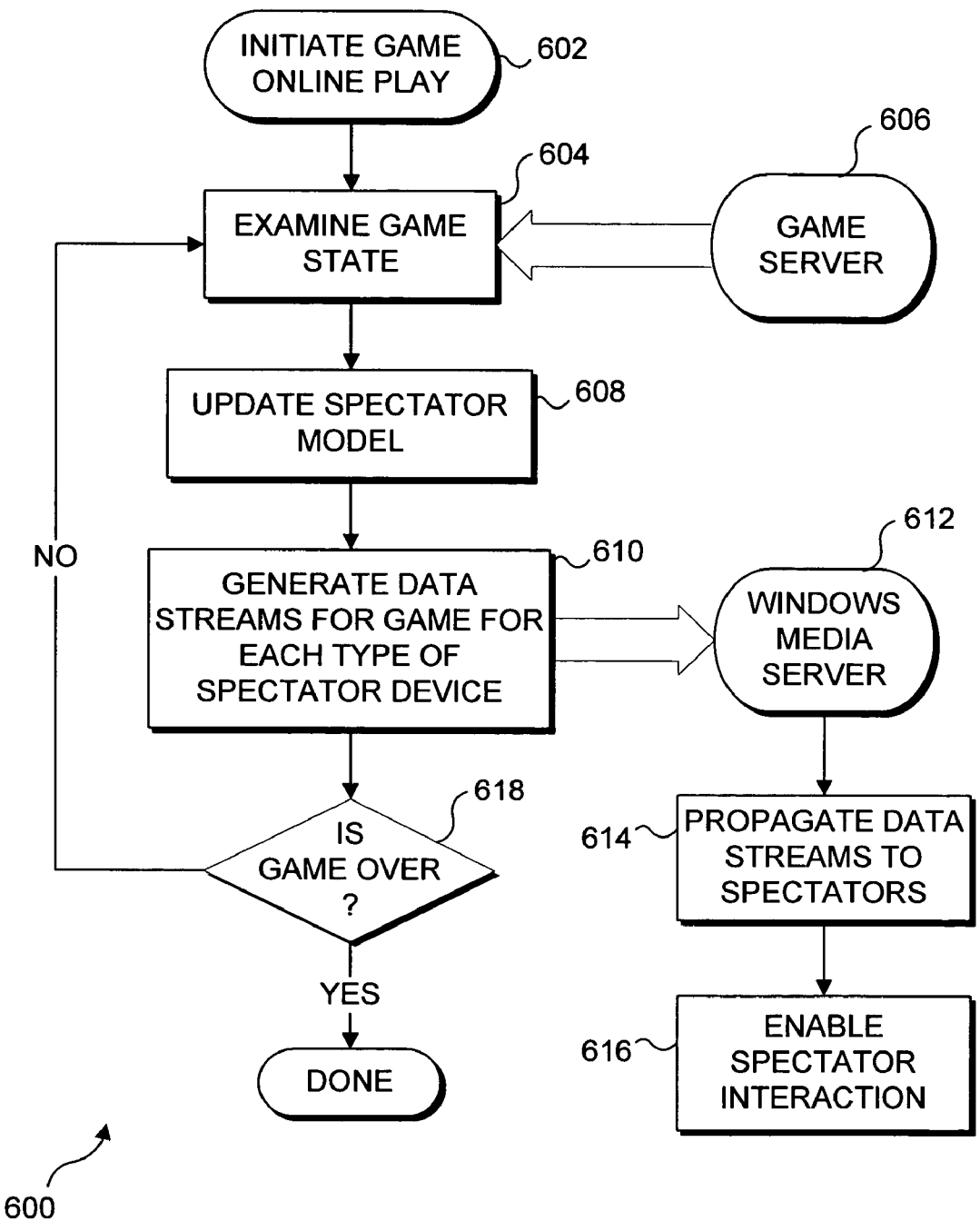
FIG. 11 is a flow chart showing the logic generally implemented to carry out the present invention.

A flowchart 600 of the logic used in the present invention is shown in FIG. 11. This logic begins in a block 602 with initiating game online play. Most events with which the present invention will likely be used will be online games; however, it should be apparent that this logic is also applicable to other types of events. A step 604 provides for the spectator process to examine the current game state through a data link with a game server 606. Unlike some of the prior art approaches, the data provided by game server 606 to the spectator process does not require that any spectator receiving a spectator data stream execute the same game software that is being executed on the electronic devices used by the participants to play the online game. The game state simply conveys the current action occurring in the game as a data stream that the spectator process is designed to convert to different formats that are appropriate for the different types of electronic devices used by spectators who are currently following the action, or that will be stored and subsequently accessed by spectators. The spectator process can alternatively produce the spectator data stream(s) on demand, when a spectator connects to the media server or other server handling the distribution of the spectator data streams and makes a request for the spectator data for a specific game or other event.

As the action in a game progresses, a step 608 provides that the spectator process updates the spectator model that is maintained, thereby following the game action as it evolves. With each updates of the spectator model, a step 610 provides that the spectator process generates data streams for the current game that can be used by each type of spectator device to follow or track the online game play. The spectator data streams are then provided to the Windows media server, as indicated in a block 612. In a step 614, the spectator data streams are propagated to each of the spectators in the form and format required by the electronic devices being used by the spectator. Optionally, as indicated in a step 616, programmatic metadata (or code already available to the spectator device) can be executed by the electronic device (e.g., a PC) to enable the spectator to interact with the online game action, by playing with one of the participants, or by choosing how to proceed with the game for comparison with what the participants chose to do in the game. It will be understood that none of the participants are aware of any decision by a spectator to play with that participant and the decision and actions of the spectator in such cases are not evident to the participants who are involved in the game. For example, a spectator can optionally choose to play alongside a participant, although without affecting the participant, by driving a race car around a course curve that the participant just completed, or by playing a hands of cards against the participants. Spectator interaction can also involve voting for the outcome, which can affect the game, or betting with other spectators in regard to the action occurring during a game or other event.

Following step 610, a decision step 618 determines if the game is over, and if not, the logic continues examining the current game state in step 604. Otherwise, if the game is completed, the logic is done.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for enabling spectators to follow play in an online game or other online event without requiring a spectator device to execute the online game or other online event, comprising the steps of:
   (a) creating a spectator process that responds to a changing state of the electronic game or other online event, said spectator process continuously updating a plurality of spectator models, wherein each spectator model is updated to track the changing state of the electronic game or other online event, and wherein the plurality of spectator models correspond to a plurality of different types of spectator devices that are being used by spectators to follow the action in the online game or other event;
   (b) using the spectator models for the plurality of different types of spectator devices, generating a different data stream customized for use by each different type of spectator device, wherein each customized data stream may be displayed by the corresponding spectator device without requiring the spectator device to execute the online game or other online event;
   (c) adding metadata to one or more of the plurality of data streams, the metadata providing executable code that enables a spectator to interact in a portion of the electronic game or other online event, as if the spectator were playing in the electronic game or other online event, but without affecting participants of the online game or other online event; and
   (d) transmitting each of the plurality of data streams to the spectator devices, enabling the spectators using the different types of spectator devices to follow the play of the electronic game by receiving a stream customized for the spectator's specific type of spectator device without requiring the spectator device to execute the online game or other online event.

2. The method of claim 1, wherein the data streams comprise at least one of audio data and visual data provided by a media server to the spectator devices over at least one network.

3. The method of claim 2, wherein the at least one network comprises at least one of the Internet, a telephone network, a local area network, a wireless network, a radio network, and a television network.

4. The method of claim 1, further comprising the step of dynamically allocating computer processing resources between computing tasks that include hosting the electronic game or other online event for participants, implementing the spectator process, and transmitting the data streams to the spectator devices, the step of dynamically allocating being done as a function of a load requirement on the computer processing resources for each of the computing tasks.

5. The method of claim 1, wherein the data streams for the different types of spectator devices have different formats meeting requirements for the different types of spectator devices.

6. The method of claim 1, further comprising the step of adding narrative audio to at least one of the data streams that are generated.

7. The method of claim 6, wherein said narrative audio comprises a primary portion of any data stream generated for spectator devices having a limited video display capability.

8. The method of claim 1, further comprising the step of hosting a chat session for at least a portion of the spectators. tk 9. The method of claim 1, wherein the metadata further provides at least one of:
   (a) an explanation of rules applied in the electronic game or other online event;
   (b) possible moves or actions that can be made by a participant in the electronic game or other online event; and
   (c) statistics based upon events that have occurred in the electronic game or other online event.

10. The method of claim 1, further comprising the step of delaying transmission of the data streams for the electronic game or other online event sufficiently long so that any information about the play in the electronic game or other online event that is provided in the data streams cannot be conveyed by a spectator, to a participant, to unfairly aid the participant.

11. The method of claim 1, further comprising the step of filtering undesired language from any audio chat by participants in the electronic game in the electronic game or other online event before transmitting the audio chat in the data streams, to the spectators.

12. A memory medium storing machine executable instructions for carrying out the steps of claim 1.

13. The method of claim 1, further comprising the step of delaying transmission of the data streams to the plurality of spectators for a defined time interval, so that a spectator receiving a data stream is unable to provide information included in the data stream to any participant during the play of the electronic game, where the information might provide an advantage to a participant receiving the information relative to other participants in the electronic game.

14. The method of claim 1 wherein the executable code comprises one of C# or Java script.

15. A method for providing a data stream to a plurality of spectators for an electronic game being played online, to enable the spectators to follow play in the electronic game, comprising the steps of:
   (a) examining a current game state;
   (b) updating a plurality of different spectator models, wherein a spectator model is updated which corresponds to one of each of a plurality of different types of devices used by spectators to follow the play in the electronic game, as a function of the current game state, producing an updated spectator model for each different type of device;
   (c) generating a plurality of appropriate data streams based upon the updated spectator model, such that a data stream customized for receipt by each different type of device being used by the spectators is generated such that each device may display the electronic game without executing the electronic game;
   (d) adding metadata to one or more of the data streams, the metadata providing executable code that enables a spectator to interact in a portion of the electronic game, as if the spectator were playing in the electronic game, but without affecting participants of the electronic game; and (e) transmitting the appropriate data streams to the type of device being used by each spectator and for which the corresponding data stream was specifically generated, to enable the spectators to follow the play in the electronic game without requiring the spectator device to execute the electronic game; and (f) repeating steps (a)-(e) until the electronic game is completed or a session enabling spectators to follow the play in the electronic game is terminated.

16. The method of claim 15, further comprising the step of hosting the electronic game that is being played by participants on a computing device that also carries out at least one of steps (a)-(e).

17. The method of claim 15, further comprising the step of including a narrative for the play in the electronic game with at least one data stream that is generated for transmission.

18. The method of claim 15, further comprising the step of providing with at least one data stream that is generated, an explanation of one of:
 (a) a play that has occurred in the electronic game; and
 (b) a rule applied in the electronic game.

19. The method of claim 15, further comprising the step of providing additional content with at least one data stream that is generated, the additional content including at least one of:
 (a) background information about one of a participant and a play that has occurred in the electronic game;
 (b) sound effects relating to a play that has occurred in the electronic game; and
 (c) an animation relating to a play that has occurred in the electronic game.

20. The method of claim 15, wherein at least one data stream includes audio data, but not video data.

21. The method of claim 15, wherein at least one data steam comprises a generic data stream that is rendered as a presentation on at least one type of device.

22. The method of claim 15, wherein the metadata further includes executable code that enables a spectator to
 make a wager on a condition in the electronic game.

23. The method of claim 15, further comprising the step of hosting one of a voice and a text chat session in which a group of the spectators are engaging while following the play in the electronic game.

24. The method of claim 15, further comprising the step of editing data streams that are transmitted to the different types of devices to do one of:
 (a) delete undesired language; and
 (b) mask the undesired language with a sound that makes the undesired language incomprehensible to a listener.

25. A memory medium storing machine executable instructions for carrying out the steps of claim 15.

26. A system for providing data streams to a plurality of spectators for an electronic game being played online over a network by a plurality of participants, wherein participants actively participate in the play of the electronic game and wherein spectators are passive viewers that do not actively participate in the play of the game, the system enabling the spectators to follow play of the electronic game on a plurality of spectator devices, the system comprising:
 (a) a memory in which machine instructions are stored;
 (b) a network interface that enables data streams to be transmitted over the network, wherein each data stream is adapted for input to one of a plurality of different spectator devices being used by the plurality of spectators such that each spectator device may display the data stream without executing the electronic game; and
 (c) a processor coupled to the memory and to the network interface, the processor executing the machine instructions and carrying out a plurality of functions, including:
  (i) examining a current game state of the electronic game;
  (ii) updating a spectator model for each of the plurality of different types of spectator devices used by a plurality of spectators to follow the play in the electronic game, and as a function of the current game state, producing an updated spectator model for each different type of spectator device being used;
  (iii) generating an appropriate data stream for each different type of spectator device, based upon the updated spectator model, such that each data stream is customized for a specific type of spectator device, and such that each data stream enables the corresponding spectator device to display the electronic game without executing the electronic game;
  (iv) adding metadata to one or more of the data streams, the metadata providing executable code that enables a spectator to interact in a portion of the electronic game, as if the spectator were playing in the electronic game, but without affecting participants of the electronic game;
  (v) transmitting each appropriate data stream over the network, for use by a corresponding type of spectator device employed by spectators to follow the play in the electronic game;
  (vi) include a narrative for the play of the participants in the electronic game within at least one audio-only stream, the narrative providing an explanation of a play that occurs in the electronic game; and
  (vii) repeating functions (i)-(vi) until the electronic game is completed.

27. The system of claim 26, wherein the machine instructions further cause the processor to host the electronic game that is being played.

28. The system of claim 26, wherein the machine instructions further cause the processor to include a narrative providing an explanation a rule applied in the electronic game.

29. The system of claim 26, wherein the machine instructions further cause the processor to include additional content relating to the play in the electronic game with at least one data stream that is generated, the additional content including:
 (a) background information about one of a participant and a play that has occurred in the electronic game;
 (b) sound effects relating to a play that has occurred in the electronic game; and
 (c) an animation relating to a play that has occurred in the electronic game.

30. The system of claim 26, wherein the metadata further includes executable code adapted to be executed on a spectator device being used by a spectator that enables the spectator to
 make a wager on a condition in the electronic game.

31. The system of claim 26, wherein the machine instructions further cause the processor to host one of a voice and a text chat session in which a set of spectators are engaging while following the play in the electronic game.

32. The system of claim 26, wherein the machine instructions further cause the processor to edit data streams that are transmitted to the different types of devices to do one of:
 (a) delete undesired language; and
 (b) mask the undesired language with a sound that makes the undesired language incomprehensible to a listener.

* * * * *

UNITED STATES PATENT AND TRADEMARK OFFICE
CERTIFICATE OF CORRECTION

| | | |
|---|---|---|
| PATENT NO. | : 7,458,894 B2 | Page 1 of 1 |
| APPLICATION NO. | : 10/943084 | |
| DATED | : December 2, 2008 | |
| INVENTOR(S) | : Damon V. Danieli et al. | |

It is certified that error appears in the above-identified patent and that said Letters Patent is hereby corrected as shown below:

In column 20, line 15, in Claim 8, after "spectators." delete "tk".

Signed and Sealed this
Tenth Day of May, 2011

David J. Kappos
*Director of the United States Patent and Trademark Office*